March 4, 1969   J. P. BRODERICK ET AL   3,430,862
PROTECTIVE SHIELD FOR A FLAME SPRAYING TORCH
Original Filed Jan. 30, 1964
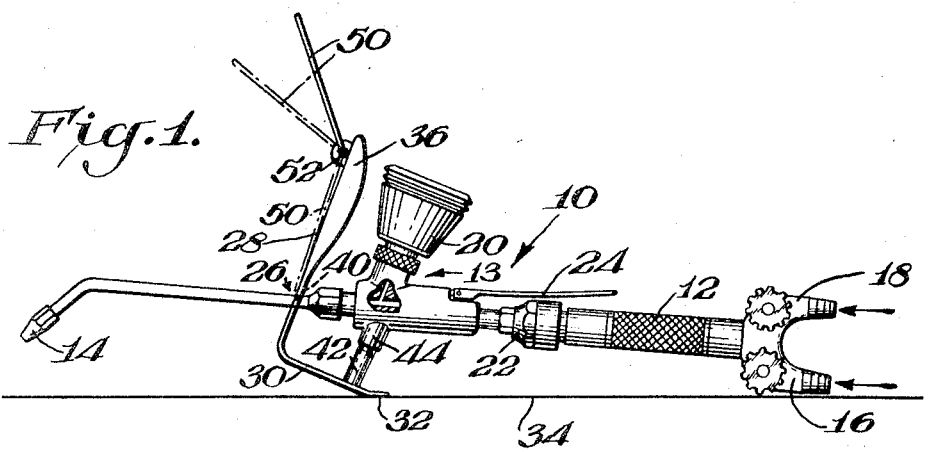
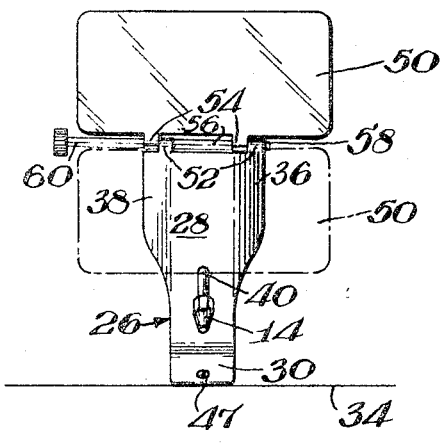
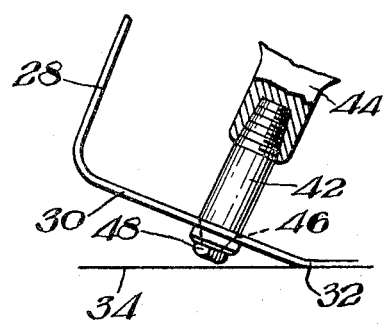
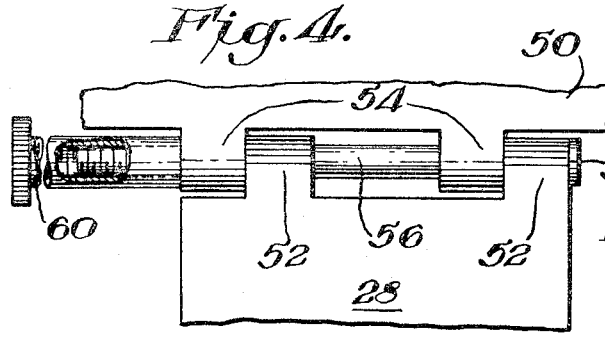
INVENTORS
John P. Broderick
Frederick Theodore Wishnie
BY Connolly and Hutz
ATTORNEYS 3,430,862
PROTECTIVE SHIELD FOR A FLAME
SPRAYING TORCH
John P. Broderick, Bayside, and Frederick T. Wishnie, Seaford, N.Y., assignors to Eutectic Welding Alloys Corporation, Flushing, N.Y., a corporation of New York
Continuation of application Ser. No. 341,231, Jan. 30, 1964. This application May 4, 1965, Ser. No. 453,132
U.S. Cl. 239—280                10 Claims
Int. Cl. B23k 5/24

This application is a continuation of copending application Ser. No. 341,231, filed Jan. 30, 1964, now abandoned.

This invention relates to a flame spraying torch for welding and more particularly to such a torch with improved shielding elements.

Flame spraying torches emit flames at such high temperatures that it is frequently necessary to provide the operator with heavy gloves and a bulky face shield to protect the operator's hands and eyes from the intense heat and light. Additionally, conventional torches are provided with complicated bench rests to elevate the flame spraying tip and thus protect it from damage when the torch is stored or in non-use. Moreover, if the tip of these torches inadvertently contacts the molten pool, the pool erupts and may spray molten metal on the operator's face and body. Additionally, since modern torch assemblies frequently incorporate heat sensitive containers, it is desirable to shield the powder container from the heat caused by the flames.

An object of this invention is to provide a simple and economical heat shield and stand for a flame spraying torch.

A further object of this invention is to provide such a torch with an eye shield to eliminate the need for cumbersome face masks or eyeglasses.

A still further object of this invention is to provide such a torch which effectively shields the heat sensitive container.

In accordance with this invention a flame spraying torch is provided with a one-piece heat shield and stand or bench rest. The shielding device includes a front shielding section between the flame ejecting tip and the gripping portion of the torch body. A bottom shielding section under the torch body cooperates with the front section in protecting the operator's hand from the heat emitted by the torch.

In accordance with another aspect of this invention a flame spraying torch is provided with a heat shield which is disposed between flame ejecting tip and the powder container. The shielding device thus protects the heat sensitive container, as well as the operator's hand from the heat emitted by the torch.

In an advantageous form of this invention an eye shield is secured to the top of the front shielding section to protect the operator's eyes, thus eliminating the need for glasses or bulky masks. The eye shield is hinge mounted so that its operating position can be adjusted to the individual requirements of the user. The combined heat shield and stand may advantageously be made from a sheet of metal bent to form the front and bottom shielding sections. The flame ejecting tip of the torch may extend through an aperture in the front section and a detachable rod may connect the bottom section of the shield to the torch body to maintain the shield stationary on the body.

Novel features and advantages of the present invention will become apparent to one skilled in the art from a reading of the description in conjunction with the accompanying drawings wherein similar reference characters refer to similar parts and in which:

FIG. 1 is a side view in elevation of one embodiment of this invention;

FIG. 2 is a front view in elevation of the embodiment of the invention shown in FIG. 1;

FIG. 3 is an enlarged view of a portion of another embodiment of this invention; and FIG. 4 is an enlarged view of a portion of the embodiment of the invention shown in FIG. 2.

As shown in FIG. 1, flame spraying torch 10 of the type disclosed in commonly assigned copending application S.N. 286,343, filed June 7, 1963 includes a body 12 having a flame ejecting tip 14 at one end and nozzles 16 and 18 at its other end. Nozzles 16 and 18 are each connected to a source of combustible gas such as acetylene and oxygen respectively. A powder container 20 secured to body 12 feeds powder into the flames which are ejected from the body. A portion 22 of body 12 including operating lever 24 is gripped by the operator when the torch is being used.

It will be understood by those skilled in the art that the intense heat emitted from the torch flame is only one of the numerous sources of heat emission that an operator of a welding torch is subjected to. For example, a bulky preheated workpiece is also a great source of heat emission especially dangerous to the operator and to any heat sensitive element on the torch assembly. In order to provide a heat buffer between the operator and the torch sensitive elements, as shown in FIGS. 1–2, a one-piece heat shield 26 is mounted on the powder injecting section 13 of body 12. Heat shield 26 can be formed for example from a ³⁄₃₂ inch thick sheet of aluminum which is bent at approximately two thirds from its top as shown in FIG. 1, to form a large front shielding section 28 extending above powder container 20 and a bottom shielding section 30. As shown in FIGS. 1 and 2, front shielding section 28 includes winged portions 36 and 38 whereby shield 26 effectively envelops the front of the operator's hand to protect it from the heat of the torch as well as from the heat emitted from a cavitated or concave workpiece. The tip 32 of bottom shielding section 30 is flat or planar and acts as a stand or bench rest when the torch is not being used. As shown in FIG. 1, stands 32 is at an acute angle with the axis of body 12 and in line with nozzle 16 so that it cooperates with nozzle 16 in elevating flame ejecting tip 14 on, for example, work bench 34.

To assemble shield 26 on torch 10, flame ejecting tip 14 is inserted through aperture 40 in front shielding section 28. A detachable rod 42 is secured to boss 44 on body 12. Rod 42 is for example chrome plated and extends below boss 44 a distance of for example 3½ to 4 inches. Rod 42 is then secured to bottom shielding section 30 for example by countersink screw 47 through bottom shielding section 30.

FIG. 3 shows an alternative manner of securing rod 42 to heat shield 26. As shown in FIG. 3, one end of rod 42 is tapered and projects through aperture 46 in bottom section 30 and is secured thereto by, for example, chrome plated pipe cap 48.

Secured to the top of front shielding section 28 is eye shield 50 which is made for example of a pigmented glass or acrylic plastic so that the operator's eyes are shielded without the necessity of wearing a face mask or eye glasses. Shield 50 is colored red or green, for example, with an American Optical Association shade number of from 3 to 7. A shade number of 5 is used with an oxy-acetylene torch. The eye shield is particularly advantageous in that it permits the positioning of the work by the operator with the left hand while the right hand holds the torch. This provides unexpectedly better control over the work since the operator does not have to remove his glasses constantly. The eye shield also adds greater safety by minimizing the probability of the operator stumbling over cables, etc, which might otherwise occur if the operator were wearing glasses or a face mask since these conventional devices have more limited vision. Eye shield 50 is secured to front portion 28 in such a manner that its angular orientation can be adjusted (as shown in phantom in FIG. 1) or so that the eye shield can be pivoted against front shielding portion 28 (as shown in phantom in FIGS. 1 and 2) thereby providing a compact unit which facilitates the storage of the device.

As shown in FIG. 4 shield 50 pivots about pin 56 through hinge members 52 on shielding section 28 and hinge members 54 on shield 50. Pin 56 carries a friction disc 58 at one end and is threaded at its other end for receiving internally threaded head 60. To adjust the position of shield 50, head 60 is rotated to release shield 50 and the shield is moved to its desired position. Head 60 is then retightened until it presses against outer hinge member 54 and thereby draws friction disc 58 against outer hinge member 52 to frictionally maintain shield 50 in position.

Shield 26 accordingly protects the heat sensitive container from the heat emitted from the torch tip. Additionally, by proper positioning of torch 10 and shield 26 with respect to the weld pool, the shield serves as an effective barrier to protect the operator from spewing molten metal if tip 14 should inadvertently contact the molten pool and cause the pool to erupt. Alternatively it will be understood that the heat shielding action of the shield 26 will allow the use of heat sensitive powder in the container.

What is claimed is:

1. A heat shield and stand in combination with a flame spraying torch having a body with a flame ejecting tip and a portion of said body being adapted for manual gripping, said shield and stand comprising a widened front shielding section secured to said body between said flame ejecting tip and said portion of said body adapted for manual gripping, a bottom shielding section integral with said front shielding section to be disposed under said body in front of said manual gripping portion whereby said front and bottom sections may shield the operator from the heat of the flames ejected from said tip, and a portion of said bottom shielding section being planar to provide a stand for said torch, an eye shield being secured to the top of said front shielding section, said eye shield being made of a material which protects the operator's eyes from the intense light of said torch, and pivot means connecting said eye shield to said front shielding section whereby said eye shield may be rotated against said front shielding section to provide a compact unit.

2. A shield and stand as set forth in claim 1 wherein said pivot means includes adjustable locking means for varying the angular orientation of said eye shield.

3. A heat shield and stand in combination with a flame spraying torch having a body with a flame ejecting tip and a portion of said body being adapted for manual gripping, said shield and stand comprising a widened front shielding section secured to said body between said flame ejecting tip and said portion of said body adapted for manual gripping, a bottom shielding section integral with said front shielding section to be disposed under said body in front of said manual gripping portion whereby said front and bottom sections may shield the operator from the heat of the flames ejected from said tip, and a portion of said bottom shielding section being planar to provide a stand for said torch, said front shielding section and said bottom shielding section are made of sheet metal bent to form said sections, said front shielding section being apertured, said flame ejecting tip extending through the aperture in said front shielding section, a connecting rod for detachable securement to said body, and fastening means detachably securing said connecting rod to said bottom shielding section.

4. A heat shield and stand for a flame spraying torch having a body with a flame ejecting tip and a portion of said body being adapted for manual gripping, said shield and stand comprising a front shielding section adapted to be secured to said body between said flame ejecting tip and said portion of said body for manual gripping, a bottom shielding section integral with said front shielding section to be disposed under said body in front of said manual gripping portion whereby said front and bottom sections may shield the operator from the heat of the flames ejected from said top, a portion of said bottom shielding section being planar to provide a stand for said torch, said planar section being disposed at an acute angle to said front shielding section for maintaining the tip of said torch elevated.

5. A flame spraying torch comprising a tip section for ejecting flames from said torch, a powder injecting section connected to said tip section, gas connecting means connected to said tip section, a gas conduit extending from said gas connecting means and through said powder injecting section and said tip section, a heat sensitive powder container for holding a heat sensitive powder mounted on said powder injecting section, a powder passageway leading from said powder container to said gas conduit whereby the powder may flow into said conduit, a heat shield connected to said powder injecting section and disposed between said powder container and said tip section for shielding said powder container to protect said heat sensitive container from the heat emitted from the tip section, and said heat shield extending at least as far above said powder injecting section as said container and partially enveloping said container.

6. A flame spraying torch as set forth in claim 5 wherein said powder container and said heat shield are disposed at an angle to said powder injecting section.

7. A flame spraying torch as set forth in claim 5 wherein an aperture is in said shield, and an elongated member being secured to said powder injecting section and extending through said aperture.

8. A flame spraying torch as set forth in claim 5 wherein said heat shield is substantially parallel to said powder container.

9. A flame spraying torch as set forth in claim 8 wherein said heat shield includes a front section of a pair of wings bent toward said container.

10. A flame spraying torch as set forth in claim 9 wherein said heat shield is made of one piece construction being formed from a unitary piece of sheet metal bent to form said wings.

References Cited

UNITED STATES PATENTS

| | | | |
|---|---|---|---|
| 1,302,438 | 4/1919 | Rudkin | 158—27.4 |
| 1,317,540 | 9/1919 | Bavor | 239—275 |
| 2,126,718 | 8/1938 | Batenburg | 239—288 |
| 3,008,514 | 11/1961 | Daly | 158—27.4 |
| 3,226,028 | 12/1965 | Schilling | 239—85 |

FOREIGN PATENTS 477,236   6/1915   France.

M. HENSON WOOD, Jr., *Primary Examiner.*

VAN C. WILKS, *Assistant Examiner.*

U.S. Cl. X.R.

239—85, 288.3